United States Patent
Brings et al.

(10) Patent No.: US 8,459,390 B2
(45) Date of Patent: Jun. 11, 2013

(54) VEHICLE HAVING DRIVE TRAIN

(75) Inventors: Wolfgang Brings, Cologne (DE); Lutz Kather, Zuelpich (DE); Harald Schmitz, Dortmund (DE); Stefan Kniesburges, Pulheim (DE); Martin Leibbrandt, Bedburg (DE); Rolf Najork, Cologne (DE); Roland Nasdal, Frechen (DE); Ingo Steinberg, Cologne (DE); Stefan Huepkes, Viersen (DE)

(73) Assignee: Getrag Ford Transmissions GmbH, Cologne (DE)

( * ) Notice: Subject to any disclaimer, the term of this patent is extended or adjusted under 35 U.S.C. 154(b) by 0 days.

(21) Appl. No.: 13/124,642

(22) PCT Filed: Oct. 15, 2009

(86) PCT No.: PCT/EP2009/007498
§ 371 (c)(1),
(2), (4) Date: Apr. 15, 2011

(87) PCT Pub. No.: WO2010/043420
PCT Pub. Date: Apr. 22, 2010

(65) Prior Publication Data
US 2011/0203859 A1   Aug. 25, 2011

(30) Foreign Application Priority Data
Oct. 15, 2008   (DE) .................. 10 2008 051 345

(51) Int. Cl.
*B60R 16/04*   (2006.01)
(52) U.S. Cl.
USPC ...................... 180/68.5; 180/65.21

(58) Field of Classification Search
USPC ............... 180/291, 68.5, 65.1, 65.23, 54.1, 180/65.31, 69.6; 903/907, 908, 944
See application file for complete search history.

(56) References Cited

U.S. PATENT DOCUMENTS 5,251,721 A * 10/1993 Ortenheim ............... 180/298
6,390,215 B1 * 5/2002 Kodama et al. ........... 180/65.22

(Continued)

FOREIGN PATENT DOCUMENTS

DE   4310001   9/1994
EP   1736345   12/2006

(Continued)

OTHER PUBLICATIONS

International Search Report issued on Mar. 2, 2010 in PCT/EP/2009/007498.

(Continued)

*Primary Examiner* — John Walters
*Assistant Examiner* — James Triggs
(74) *Attorney, Agent, or Firm* — Schlee IP International, P.C.; Alexander R. Schlee

(57) ABSTRACT

The invention relates to a vehicle having a drive train, which comprises at least one first engine and a wheel, wherein a torque can be transmitted from the first engine to the wheel by the drive train, and wherein at least one first unit of the drive train is connected to an interface, by which rapid and simple replaceability of said unit is possible, wherein the interface is designed to be connected to a second unit, which is different from the first unit, wherein both units are designed to store electricity, to convert chemically bound energy into energy of rotation and/or to convert electricity into energy of rotation and/or to convert rotation energy of rotation into electricity.

5 Claims, 6 Drawing Sheets

U.S. PATENT DOCUMENTS

| | | | |
|---|---|---|---|
| 6,622,804 B2 * | 9/2003 | Schmitz et al. | 180/65.245 |
| 6,877,576 B2 * | 4/2005 | Wilton et al. | 180/65.245 |
| 2006/0289209 A1 | 12/2006 | Grosspietsch | |

FOREIGN PATENT DOCUMENTS

| | | |
|---|---|---|
| GB | 2443272 | 4/2008 |
| WO | 2005075235 | 8/2005 |

OTHER PUBLICATIONS

English Translation of the Written Opinion issued Mar. 2, 2010 in PCT/EP/2009/007498.

* cited by examiner

Fig. 3a: Transmission A
For the use "VKM with direct coupling to the wheels"

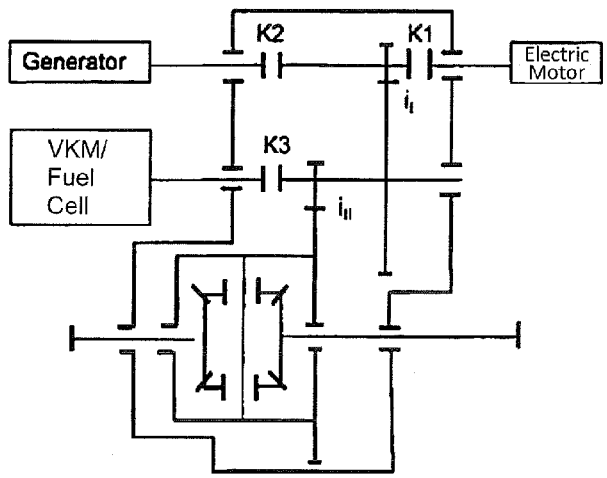

Features:
1. The power machine and the generator can be flanged to one and the same transmission.
2. The transmission comprises clutches for a specific use of the power machine and the generator. The transmission comprises the necessary transmission ratio for the entire system of the vehicle.
3. The transmission $i_I$ can facilitate the pulse start of the VKM
4. The power machine can be configured such that a 2- gear speed powershift transmission can be omitted (gear speed $i_{II}$)
5. In comparison with the assembly provided on the shaft of the VKM/fuel cell the generator rotates as a higher rotational speed.

Fig. 3b

| Operational Mode | | K1 | K2 | K3 |
|---|---|---|---|---|
| Drive with electric motor | Driving power | X | - | - |
| | Recuperate | - | X | - |
| Drive with combustion engine | Driving power | - | - | X |
| | Recuperate | - | X | - |
| "Boosting" by the combustion engine | | X | - | X |

Fig. 4a: Transmission B
For the use "VKM with direct coupling to the wheels"

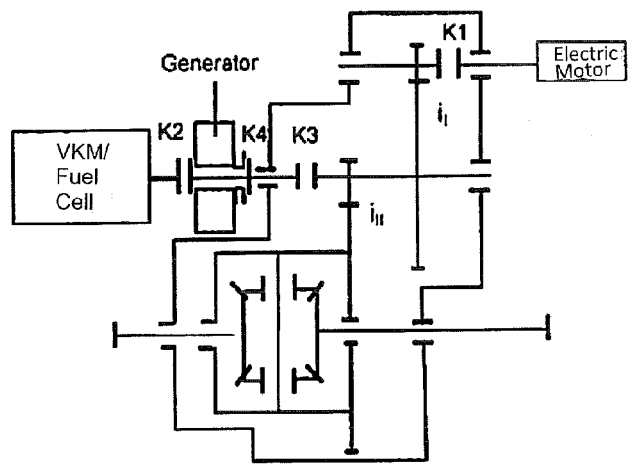

Features in comparison to Transmission A:
1. Recharging of the rechargeable battery by mean of the VKM/fuel cell is possible when the vehicle stands still.
2. Additional clutch K4
3. Low power consuming clutches (usually closed, positively interlocking, self-locking)

Fig. 4b

| Operational Mode | | K1 | K2 | K3 | K4 |
|---|---|---|---|---|---|
| Drive with electric motor | Driving power | X | - | - | - |
| | Recuperate | - | - | X | X |
| Drive with combustion engine | Driving power | - | X | X | - |
| | Recuperate | - | - | X | X |
| "Boosting" by the combustion engine | | X | X | X | - |
| Charging of the rechargeable battery via the combustion engine a) simultaneously to driving with electric motor | | X | X | - | X |
| b) when the vehicle has stopped | | - | X | - | X |

Fig. 5: Transmission C
For the use "VKM with direct coupling to the wheels"
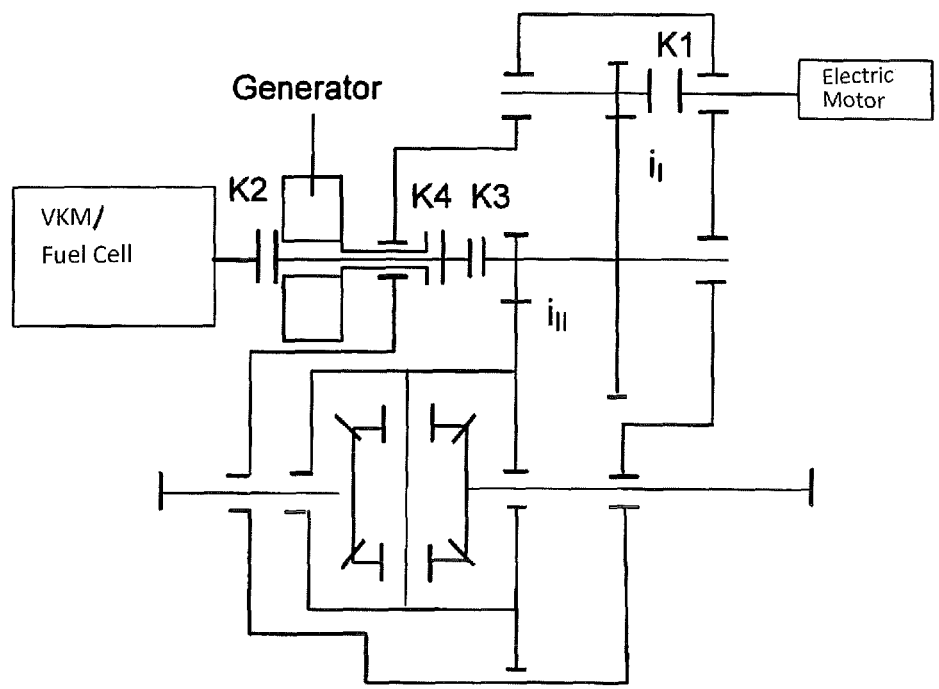

Fig. 6a: Transmission D

| Operational Mode | | K1 | K2 |
|---|---|---|---|
| Drive with electric motor | Driving power | - | X |
| | Recuperate | - | X |
| Drive with combustion engine | Driving power | X | X |
| | Recuperate | - | X |
| "Boosting" by the combustion engine | | X | X |
| Charging of the rechargeable battery via the combustion engine a) simultaneously to driving with electric motor | | X | X |
| b) when the vehicle has stopped | | X | - |

VEHICLE HAVING DRIVE TRAIN

CROSS-REFERENCE TO RELATED APPLICATION

This application is a national phase of the International Patent Application PCT/EP2009/007498 filed on Oct. 15, 2009 that claims the priority from the German patent application 10 2008 051345.8 dated Oct. 15, 2008.

BACKGROUND OF THE INVENTION

The invention relates to a vehicle comprising a drive train having at least a first motor and a wheel, wherein a torque is transmitted through the drive train from the motor into the wheel, and wherein at least a first unit of the power train is connected to an interface allowing an easy and fast exchangeability of the unit.

It is known in the prior art to exchange via an interface in a vehicle comprising a first motor that is designed as an electric machine a discharged rechargeable battery by a fully charged electrical battery providing electric energy storage. This avoids longer stand still time for the vehicle which would otherwise be necessary for recharging a rechargeable battery by an external electric power source.

SUMMARY OF THE INVENTION

While the simple and fast exchangeability of rechargeable batteries provides one possibility to increase the driving range of vehicles powered by electric machines without any longer stand still time periods, there is a desire to develop the vehicles further so that the driving range, driving comfort and/or energy supply is more advantageous.

According to an aspect of the invention, the aforementioned and other objects are achieved by a vehicle comprising a drive train having at least a first motor and a wheel, wherein a torque is transmitted through the drive train from the motor into the wheel, and wherein at least a first unit of the power train is connected to an interface allowing an easy and fast exchangeability of the unit, wherein the interface is designed to be connected to a second unit that differs from the first unit, wherein both units are designed to store electric energy, to convert chemically bound energy into mechanical rotational energy, and to convert electric energy into mechanical rotational energy and/or convert mechanical rotational energy into electric energy.

DETAILED DESCRIPTION OF THE INVENTION

For example, the first unit can be a rechargeable battery and the second unit may comprise a machine for generating mechanical rotational energy. This machine may for instance be a combustion engine or an electric machine.

If the vehicle comprises for instance as a first motor an electric machine, this provides the option to connect via the interface either the rechargeable battery or the second unit with the vehicle or with the vehicle's drive train for providing in this manner by installation of the second unit for instance more driving power for the vehicle. It is also possible by exchanging the rechargeable battery by a second unit that comprises the combustion engine to increase the driving range of the vehicle.

If for instance such a design is taken as a starting point where via an interface on the one hand a rechargeable battery and on the other hand a combustion engine are coupled to the drive train, the interface comprises preferably a connection for transmitting electric energy and a connection for transmitting mechanical rotational energy. In this case, the combustion engine can be directly coupled to the drive train, i.e. the combustion engine provides a torque directly via the drive train to the wheel. However, there is the possibility that the second unit comprises an electric generator that is driven by the combustion engine. In this case, it would be sufficient if the interface comprises apart from possible additional connections only a connection for transmitting electric energy by means of which either electric current is transmitted from the rechargeable battery or electric current is transmitted from the generator.

The second unit may also be a fuel cell and comprise an electric motor.

Preferably, the first unit and the second unit differ from each other such that the first unit is designed to store only electric energy and to release and/or accumulate this electric energy, while the second unit is designed to convert chemically bound energy into mechanical rotational energy as this is for instance the case in a combustion engine converting the energy contained in the fuel into heat and then into mechanical rotational energy. The difference between the first and second unit can also be limited to the first unit for example converting electric energy into mechanical rotational energy, while the second unit converts the aforementioned chemically bound energy into mechanical rotational energy. The difference between the first and the second unit can also be in that the first unit only opens the possibility to convert chemically bound energy in a combustion engine into mechanical rotational energy, while the second unit comprises in addition to this combustion energy also a generator allowing to convert mechanical rotational energy into electric energy, the mechanical rotational energy originating either from the combustion engine or from a second source from the drive train.

One of the two units or both units may comprise a fuel tank and an exhaust gas treatment system so that the respective unit is independent and requires only to be connected to the vehicle and/or the drive train for transmitting mechanical rotational energy. It is also possible to design the interface such that it facilitates the fuel supply so that the fuel tank and the respective unit can be separated from each other. The same applies in analogy to the exhaust gas treatment system. Also in this case it is possible to provide the interface with a connection guiding exhaust gas from the respective unit to an exhaust gas treatment system that is installed within the vehicle in a fixed manner.

Preferably, the first unit and the second unit can be coupled in the fully automatic manner to the interface. In a useful manner, the units can also be coupled to and removed from the interface in a fully automatic manner. According to a preferred embodiment, the first unit and the second unit can be coupled to the interface from the bottom side of the vehicle. For this purpose, the vehicle can for instance be placed on an apparatus that removes the first unit that is installed into the vehicle in a fully automated manner from underneath the vehicle and then couples in a second step the new second unit from underneath via the interface to the vehicle. This allows minimizing the time needed for exchanging the units without the need for the driver to leave the vehicle.

Preferably, the interface comprises quick connects and plug-type connections which are easy to separate and to close.

The drive train may comprise a transmission with at least one first clutch allowing to separate transmission-wise an electric machine from the wheel. The transmission may also comprise a second clutch allowing to separate transmission-wise a combustion engine from the wheel. For instance in case of an open second clutch it is possible while the vehicle has stopped to let the combustion engine run for recharging the rechargeable batteries by means of a generator. Further, the transmission may comprise additional clutches allowing to connect the electric machine and the combustion engine for different operating modes with each other. For example, it is possible to apply the combustion engine for particularly strong acceleration action in addition to the electric machine while during normal cruising the combustion engine is only provided for providing mechanical rotational energy converted into electric energy for driving the electric machine. For this reason, the transmission comprising the different clutches allows to establish a serial hybrid drive train, a parallel hybrid drive train, and combinations of both.

BRIEF DESCRIPTION OF THE DRAWINGS

By referring to the figures in the drawing the invention is discussed in the following in more detail. In the drawings show:

FIG. 3 schematically a first embodiment of a transmission and demonstrating possible operating modes (see FIG. 3b);

FIG. 4 a further transmission with possible operating modes (see FIG. 4b);

FIG. 5 a further transmission; and

DETAILED DESCRIPTION OF THE DRAWINGS

Figure 1:
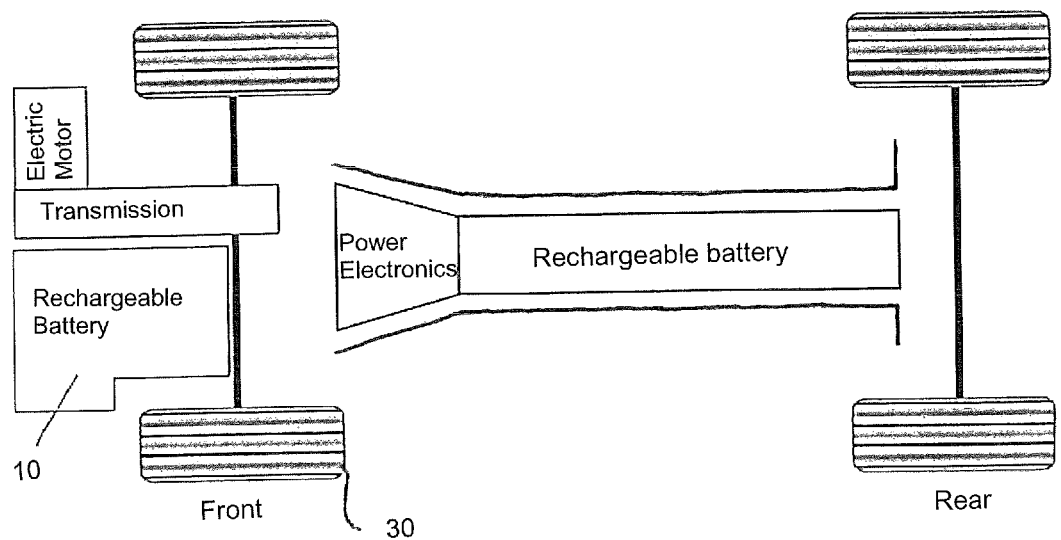
FIG. 1 a vehicle with an exchangeable rechargeable battery.

Prior to discussing the respective figures in detail below, certain specific aspects of the invention are described in the following in different words. For instance, the invention can be interpreted in that it creates a device for enhancing the cruising range of a vehicle that is powered by an electric motor and/or a combustion engine.

In modern vehicles, high demands are made on the efficiency of the drive train. For enhancing the efficiency, hybrid concepts are used in motor vehicle construction. Two classic concepts have been known. According to a serial hybrid concept the electric motor drives a vehicle and the energy source may either be a combustion engine (VKM) or a fuel cell and generating either via a generator or directly electric energy for the electric motor. According to a parallel hybrid concept either an electric motor and/or a combustion engine may drive the motor vehicle.

For a vehicle that is solely driven by electric motors with a rechargeable battery as an energy source the cruising range of the vehicle is limited. For enhancing the cruising range, it is known to provide a combustion engine or a fuel cell as an energy source. An electric machine that can be operated as an electric generator converts the mechanical power provided by the combustion engine into electric energy. This electric energy can either be used directly for driving an electric motor or can be stored in rechargeable batteries so that the energy is available when needed.

Therefore, electric drive systems are known that comprise rechargeable batteries as the sole energy storage device or comprise combustion engines or fuel cells in addition to the rechargeable batteries as energy source.

It would be desirable to increase the cruising range of a vehicle driven by an electric motor according to the customer's specification in a more flexible manner.

According to a preferred embodiment of the invention a retroactive installation of an independent power assembly (named "Range Extender") can be installed into a motor vehicle. This power assembly or unit comprises preferably an electric generator, power electronics and a combustion engine powering the electric generator. In the alternative, it would also be possible to provide a fuel cell as an individual power assembly, wherein the power electronics provided in the vehicle should be designed for also powering by means of a fuel cell. According to a further embodiment the power assembly comprises a fuel cell and an electric motor, wherein a mechanical coupling is provided between the electric motor of the power assembly and the transmission. In this connection, it should be noted that the power assembly comprises an individual, exchangeable assembly group or is an individual, exchangeable module. This power assembly can be provided at a free position within the vehicle or may replace a rechargeable battery. The power assembly may also comprise a fuel supply and an exhaust gas treatment for the combustion engine driving the electric generator.

Figure 2:
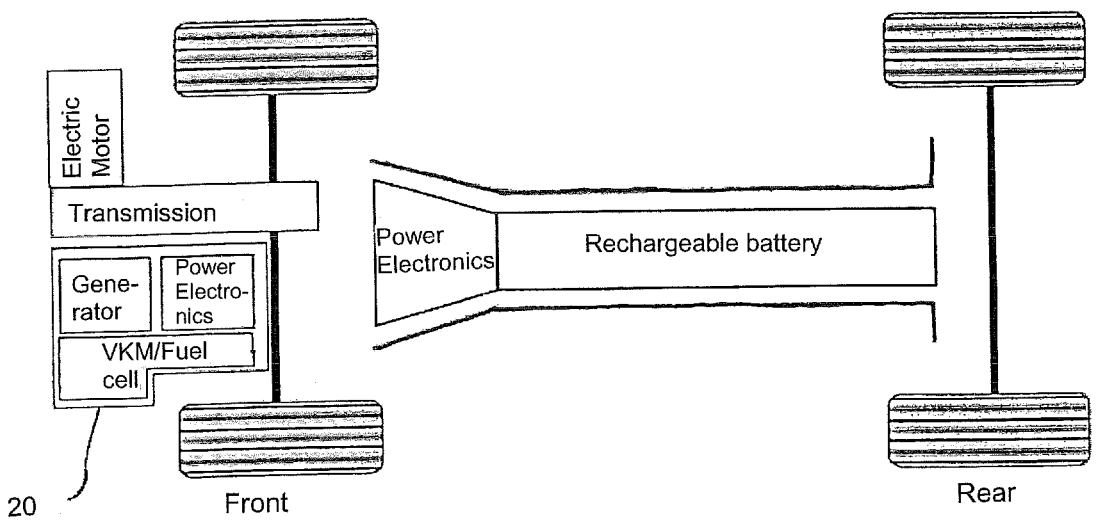
FIG. 2 the vehicle according to FIG. 1 but comprising a unit that substitutes the rechargeable battery.

FIG. 1 shows a vehicle powered by an electric motor. FIG. 2 shows an alternative implementing an increased cruising range and at which the rechargeable battery as shown in FIG. 1 has been replaced by the described power assembly.

By providing the appropriate interfaces to the vehicle, which interfaces may be of electrical and/or mechanical nature, an easy installation into the vehicle is possible. The contact panels are preferably optimized for a quick exchangeability and, for instance the alignment of the contact panels may comprise spigots for facilitating centering or may be predefined by the housing form of the power assembly or by flanges. By means of a transport system that swivels in automatically the rechargeable battery or the range increasing power assembly can be transported by the customer without any workshop assistance to the vehicle and installed therein. In the alternative, exchanging the rechargeable battery by a cruise range increasing power assembly and vice versa can be accomplished automatically at fuel stations by means of exchange apparatuses.

The following discussion relates to a transmission that may be part of a drive train of a motor vehicle. As far as the invention relates to the transmission, the invention can also be used independently from the described exchangeability between the first and second unit.

For a vehicle, a combination of a parallel hybrid concept and a serial hybrid concept should provide a high availability of the system. This accomplishes that a transmission comprising clutches can be used in the following highly efficient manner for accomplishing its function: a transmission A may couple several drive units and working units and separate it from each other for providing a rotational speed differential in case of driving through a curve and can provide driving by an electric motor and/or a combustion engine as well as choose an acceleration function (also called boost-function). In case of transmissions B and C it is also possible to charge a rechargeable battery during driving action of the vehicle (also a serial hybrid) or when the vehicle has stopped by means of a drive machine provided in the vehicle.

The FIGS. 3a, 4a and 5 show transmissions A, B and C. K1 to K4 demonstrate clutches. Transmissions B and C differ from each other by the disposition of clutch K4. For the transmission B the clutch K4 is provided outside of the transmission. The advantage of such an external clutch K4 is that the already present single disk dry clutch that is provided as a standard in the vehicle can be used. In the transmission C, the clutch K4 is provided within the transmission. A reason for using the transmission C may be to use wet clutches K4 if desired. Another reason might be to use a common gear shifting mechanism for clutches K3 and K4 that comprises preferably three gear shifting positions (K3 closed and K4 open, K3 and K4 closed, and K3 open and K4 closed). Instead of two individual clutches K3 and K4, in the alternative, a dual clutch can be provided for saving space.

The clutch K1 may also be provided on the shaft of the clutch K3. It is particularly advantageous to position both gear speeds on the shaft of the combustion engine since this accomplishes that in case of an open clutch K1 the first gear speed I would not need to be driven idle as well. This applies also for the transmissions B and C.

According to all alternatives, the clutch K2 is provided outside of the transmission, for instance for allowing to use the standard single disk dry clutch that is already provided in each vehicle as a standard. Technically advantageous may also be to provide an assembly within the transmission, which can for instance be a wet clutch.

If the generator is designed as an electric machine that may also be used as an electric motor, this would allow to start the combustion engine by means of the electric motor.

In FIG. 3b different operating modes are demonstrated for the transmission A shown in FIG. 3a. Closed clutches are denoted with "x", open clutches are denoted as "–". In a plain electric machine operating mode the vehicle can be driven by closing clutch K1 in an electric motor mode. When closing clutch K2, the provided generator can recuperate energy from inertial force, i.e. generate electric energy. By closing the clutch K3 a combustion engine driving mode can be established, wherein torque is transmitted from the combustion engine into the wheels. Again, by closing the clutch K2, the generator can recuperate energy from the inertial force of the vehicle. If the driver desires a high acceleration rate, by closing the clutches K2 and K3, a higher torque can be transmitted, namely in addition to the torque from the combustion engine torque can be transmitted as well by the electric motors into the wheels.

FIG. 4b shows the specific operating modes of the transmission shown in FIG. 4a. Closed clutches are shown with "x", open clutches are shown as "–". In an "electric machine operating mode" the vehicle can be driven by closing clutch K1 to transmit torque into the wheels. When closing clutches K3 and K4, the provided generator can recuperate energy from inertial force. In the "combustion engine operating mode" that can be established by closing the clutches K2 and K3, torque can be transmitted from the combustion engine into the wheels. In the recuperating mode phase, by closing clutches K3 and K4, electric energy can be generated by the generator. If the driver desires a high acceleration rate, by closing the clutches K1, K2 and K3 a higher torque can be transmitted by transmitting torque from the combustion engine and the electric motors into the wheels. An additional operating mode can be "recharging the rechargeable batteries via the combustion engine", wherein the rechargeable batteries are recharged in parallel to the electric motor driving mode via closing the clutches K2, K2 and K4 during the running combustion engine. If the vehicle stands still, the rechargeable battery can be recharged via the combustion engine by closing the clutches K2 and K4.

In the alternative, in the clutch A, the electric motor or generator as well as the clutch can be attached at the opposite end of the shaft as the end of the shaft that is connected to the combustion engine if no gear speed $i_I$ is necessary.

As an alternative, the generator and the electric motor can be combined into a single electric machine. This allows also combining the clutches K1 and K2 into one single clutch. The operating modes of the transmission are changed according to FIG. 3b, so that all locations denoted "x" in the clutches K1 can be provided by one joint clutch and only in the operational mode "combustion engine operating mode" the joint clutch is open.

The position of the electric machine and the clutch can be as shown in FIG. 3a at the location where the generator and its clutch and the electric motor and its clutch are provided, while the location of the electric motor and its clutch can also be provided at that end of the shaft that is opposite to the combustion engine.

As an alternative, the transmission B of the electric motor and its clutch can provided at that end of the shaft that is opposite the combustion engine if no gear $i_I$ is necessary.

The electric motors, generators and combustion engines provided in the transmissions A to C can be part of the power assembly for increasing the driving range. The additional component parts of the power assembly can be used via component parts of the transmission.

In a vehicle, the combination of a parallel and a serial hybrid-electric power train at a high availability rate should be provided. In contrast to the embodiments described above this should be achieved by a simple design comprising relatively few component parts.

A transmission D comprising clutches should accomplish the following objects in a highly efficient manner:

Coupling and separating several power machines and work machines for providing a rotational speed differential in case of driving the vehicle through a curve; allow driving by the electro motor and/or combustion engine as well as accomplish an acceleration mode (also called "boost-function"). Further, a power machine provided in the vehicle may during driving the vehicle (as a serial hybrid power train) or also when the vehicle is standing still recharge the rechargeable batteries.

The FIG. 6a comprises the transmission D. K1 and K2 are clutches.

The electric machine can be operated as a generator or as an electric motor and can be used as the primary drive mechanism.

By using the electric machine that is capable during operation to achieve higher rotational speeds in comparison to the combustion engine, another gear speed might be provided between the electric machine and the shown transmission.

The transmission ratio of the gear speed $i_{II}$ is preferably chosen such that the vehicle can also be driven at higher velocities (for instance higher than 100 km/h) by means of a combustion engine.

In an embodiment where the gear speed $i_{II}$ comprises at least two shiftable gear speeds, the combustion engine may also cover slower velocities (for instance slower than 100 km/h). Shifting gear speeds can preferably be accomplished under load so that no interruption in the driving power is necessary.

Figure 6B:
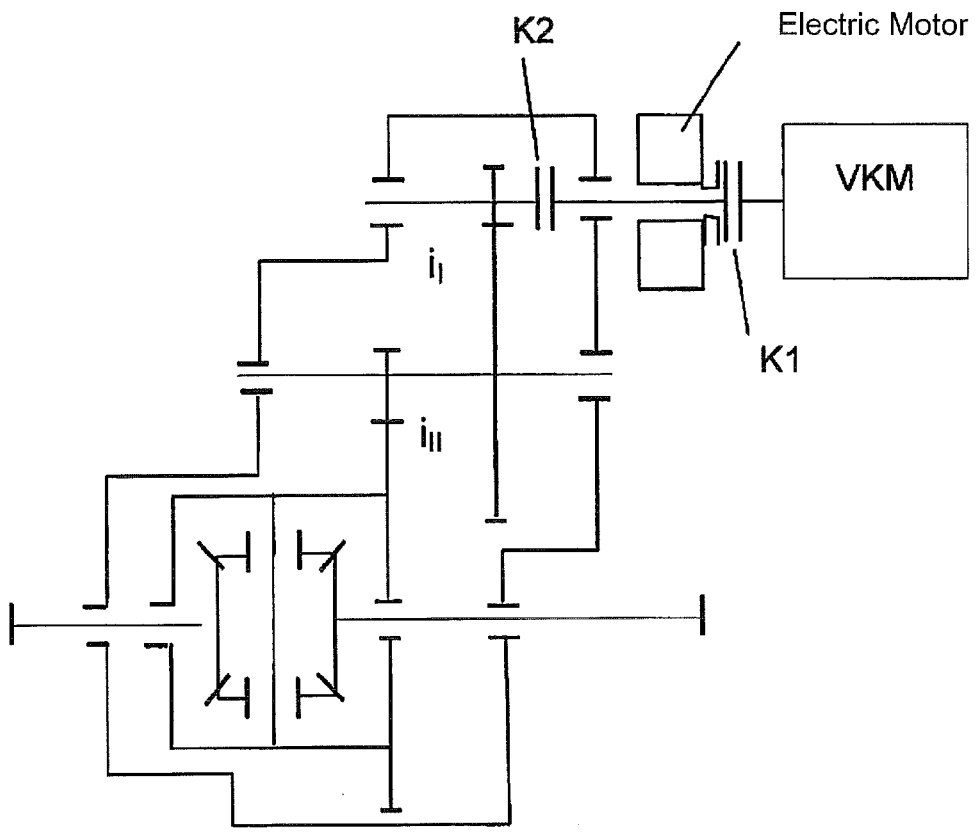
FIG. 6 a further transmission with various operational modes (see FIG. 6b).

In FIG. 6b individual operational modes of the transmission shown in FIG. 6a are shown. Closed clutches are shown with "x", open clutches are shown as "–". In an "electric machine operating mode" the vehicle can be driven by closing clutch K2 to transmit torque into the wheels. In a coasting mode, the generator can recuperate energy from inertial force while the clutch K2 is closed. In the "combustion engine operating mode" that can be established by closing the clutches K1 and K2, torque can be transmitted from the combustion engine into the wheels. In the recuperating mode phase, by closing the clutch K2, electric energy can be generated by the generator. If the driver desires a high acceleration rate, by closing the clutches K1 and K2 a higher torque can be transmitted by transmitting torque from the combustion engine and the electric motors into the wheels. The operating mode "recharging the rechargeable batteries via the combustion engine" can be established simultaneously to driving the vehicle by the electric motor by closing the clutches K1 and K2. If the vehicle stands still, the rechargeable battery can be recharged via the combustion engine by closing the clutch K1.

The electric machine and the combustion engine provided in the transmission D can be part of the concept according to the invention, accomplishing that one unit can be easily substituted by another unit for influencing the properties of the power train. The further component parts of the power assembly can be component parts of the transmission.

FIG. 1 shows a vehicle comprising a first unit 10 that is designed as a rechargeable battery. In this configuration, the vehicle comprises a plain electric power train. This embodiment comprises the following features:
1 Rechargeable battery provided in the vehicle tunnel
2 Optionally, a second rechargeable battery can be provided in the motor space
3 A plug-in hybrid electric power train 220/380 V It is to be noted that for the reasons of driving dynamics the rechargeable battery should preferably be provided between the axles.

FIG. 2 shows the vehicle according to FIG. 1, but here with a second unit 20 which is the "Range-Extender". This unit 20 comprises a combustion engine VKM or a fuel cell, a generator and power electronics. Also, a direct coupling between the VKM/fuel cell and the wheels 30 of the vehicle is provided.

The following features with regard to FIG. 2 are pointed out:
1 Rechargeable battery provided within the vehicle tunnel
2 Exchangeability of an energy storage device by the assembly "Range-Extender" comprising a "combustion engine, generator and power electronics/fuel cell/fuel cell plus electric motor"
3 increasing the driving range by retroactive installation of the assembly "Range-Extender" comprising a "combustion engine, generator and power electronics/fuel cell/fuel cell plus electric motor"
4 Plug-In Hybrid 220/380 V

What is claimed is:

1. A electric vehicle comprising:
a plain electric drive train system having at least a first electric motor, a transmission and a wheel, wherein a torque is transmitted through the drive train from the motor into the wheel; wherein the drive train system further comprises:
a rechargeable battery;
a fuel cell; and
an interface comprising quick connect and plug-type connections, the interface being designed to connect in the alternative the rechargeable battery or the fuel cell to become part of the drive train and allows to physically remove the rechargeable battery and substitute it by the fuel cell and to physically remove the fuel cell and substitute it by the rechargeable battery.

2. The vehicle according to claim 1, wherein the fuel cell comprises a fuel tank and an exhaust gas treatment system.

3. The vehicle according to claim 1, wherein the rechargeable battery and the fuel cell are connectable to and separable from the interface in a fully automatic fashion.

4. The vehicle according to claim 1, wherein the rechargeable battery and the fuel cell are connectable to the interface from underneath the vehicle.

5. The vehicle according to claim 1, wherein the power train comprises a least a first clutch separating or connecting the electric machine from the wheel for enabling or disenabling torque transmission between the electric machine and the wheel.

* * * * *